United States Patent
Grundfast et al.

(10) Patent No.: US 8,566,817 B2
(45) Date of Patent: Oct. 22, 2013

(54) SYSTEM AND METHOD OF ADVERTISING FOR USE ON INTERNET AND/OR DIGITAL NETWORKING CAPABLE DEVICES

(75) Inventors: David Grundfast, Brighton, MA (US); Jesse Lopez, Newtonville, MA (US); Raymond Giles, Brighton, MA (US)

(73) Assignee: Obelus Media Inc., Newton, MA (US)

( * ) Notice: Subject to any disclaimer, the term of this patent is extended or adjusted under 35 U.S.C. 154(b) by 577 days.

(21) Appl. No.: 12/828,830

(22) Filed: Jul. 1, 2010

(65) Prior Publication Data

US 2011/0219366 A1  Sep. 8, 2011

Related U.S. Application Data (60) Provisional application No. 61/309,690, filed on Mar. 2, 2010.

(51) Int. Cl.
*G06F 9/44* (2006.01)
*G06Q 30/00* (2012.01)

(52) U.S. Cl.
USPC .......................................... 717/171; 705/14.4

(58) Field of Classification Search
USPC ............. 707/10, 513; 455/419; 709/246, 217; 725/34, 37; 705/10, 14, 14.4; 717/168–171
See application file for complete search history.

(56) References Cited

U.S. PATENT DOCUMENTS

| | | | |
|---|---|---|---|
| 5,781,894 A | 7/1998 | Petrecca et al. | |
| 6,011,537 A | 1/2000 | Slotznick | |
| 7,886,067 B2 | 2/2011 | Krassner et al. | |
| 2002/0092019 A1* | 7/2002 | Marcus | 725/37 |
| 2003/0028565 A1* | 2/2003 | Landsman et al. | 707/513 |
| 2004/0132530 A1 | 7/2004 | Rutanen et al. | |
| 2005/0014494 A1* | 1/2005 | Owen et al. | 455/419 |
| 2006/0100928 A1 | 5/2006 | Walczak et al. | |
| 2006/0282316 A1* | 12/2006 | Snyder et al. | 705/14 |
| 2007/0088801 A1* | 4/2007 | Levkovitz et al. | 709/217 |
| 2007/0088852 A1* | 4/2007 | Levkovitz | 709/246 |
| 2007/0168354 A1* | 7/2007 | Ramer et al. | 707/10 |
| 2008/0059571 A1 | 3/2008 | Khoo | |
| 2008/0214150 A1 | 9/2008 | Ramer et al. | |
| 2008/0263673 A1 | 10/2008 | Brun et al. | |
| 2009/0210899 A1* | 8/2009 | Lawrence-Apfelbaum et al. | 725/34 |
| 2010/0036740 A1* | 2/2010 | Barashi | 705/14.71 |
| 2010/0082397 A1* | 4/2010 | Blegen | 705/10 |
| 2011/0082743 A1 | 4/2011 | Rutman | |

* cited by examiner

*Primary Examiner* — Tuan A Vu (74) *Attorney, Agent, or Firm* — Skaar Ulbrich Macari, P.A.

(57) ABSTRACT

A system and method of advertising for use on an internet and/or digital networking capable device, wherein the system allows advertisers to use a loading space generated during the initiation of a process on the device to post any media and/or advertising content during the time between when a program or web page is requested and when it actually loads.

12 Claims, 7 Drawing Sheets

SYSTEM AND METHOD OF ADVERTISING FOR USE ON INTERNET AND/OR DIGITAL NETWORKING CAPABLE DEVICES

CROSS REFERENCE TO RELATED APPLICATION

This application claims priority to and takes the benefit of U.S. Provisional Application No. 61/309,690, filed on Mar. 2, 2010, the contents of which are hereby incorporated by reference.

BACKGROUND OF THE INVENTION

1. Field of the Invention

This invention relates generally to methods of advertising, and more particularly to a system and method of advertising preferably for use with internet and/or digital networking capable devices ("IDNCD").

2. Description of the Related Art

Currently, six out of every ten people worldwide have access to high speed internet with over four billion internet and/or digital networking capable devices in existence. Furthermore, over half a billion people worldwide have been able to access the internet through a mobile web device as of the year 2009 and that number continues to grow. However, even with the increase in users of both internet capable devices and those who have been able to access the internet through such a device, the current methods of sharing digital information simply have not been able to keep up with the times. Presently, both the manner and mode of advertising and delivering information to INDCD's has remained unchanged, and been provided to individual user's of these devices in the same format that has been in use for many years on websites and other digital media.

Initially, screens on smaller web capable devices pose a problem when trying to share media content or advertising. In the often strained relationship between media content sharing and internet and/or digital networking capable devices, advertising must be agreeable to the user. When using an internet and/or digital networking capable device that has limited visual space, the less intrusive the advertising is to the user, the better the user's experience. Internet and/or digital networking capable device users are usually working on essential tasks or using a specific program to accomplish a task, and therefore, intruding with an advertisement during this time can be annoying and potentially aggravating to a user.

Currently, internet and/or digital networking capable devices are untapped resources for advertising. For example, in India, mobile devices accounted for nearly ninety percent of all internet users in 2008. As such, brands are able to pinpoint and profile users much more efficiently on an internet and/or digital networking capable device. Additionally, advertising on an internet and/or digital networking capable device provides advertisers a much more intimate exposure to users.

There are multiple reasons why mobile web advertising is increasing in popularity with large companies including that, mobile phones are highly personal and are always with the user, along with the most direct way an advertiser can connect with the public is through their mobile phone.

The lack of competition on a mobile web page is one of the best aspects of mobile advertisement, since due to the small space a displayed advertisement will not have to share the page with other advertisers. While banner ads and pop-ups saturate websites, through a mobile interface, these advertisements may be displayed in a more user friendly and personal manner that is easy to read.

Therefore, this small space for advertising gives a unique opportunity to advertisers, but is currently thought of as a detriment to this medium. There needs to be a unobtrusive way to use this mobile space to connect users and brands.

SUMMARY OF THE INVENTION

The instant invention, as illustrated herein, is clearly not anticipated, rendered obvious, or even present in any of the prior art mechanisms, either alone or in any combination thereof.

The present invention allows for advertising to be displayed on internet and/or digital networking capable devices in a novel and unique manner. Advertisers will be able to display content and/or media on the screen of the device during the time between when a program or web page is requested and when it actually loads. In one embodiment, the system employs a plurality of internet connections, as well as servers, databases and other mediums employed by networks. The media content may be downloaded and/or cached on a device prior to display or it may be accessed in real time depending on the device and/or individual preferences of a user. The content or media will be triggered to display when a process occurs on the device which necessitates a pause while content or media is loaded or retrieved.

Currently, this space is underutilized and is often populated by a simple phrase such as "loading . . . "; the instant system is disposed to utilize this space. The method of the present invention is meant not to interfere with the process necessitating the loading or retrieving, but may continue after the process has finished if the programmer so wishes. The content or media that was originally requested, which necessitated the loading or retrieval process, is then delivered after the advertising ceases to display.

The primary innovation of the present invention is the use of the underutilized "loading space". Advertisers will be able to seamlessly integrate media into processes that are already necessary and occurring on internet and/or digital networking capable devices. The instant system and method creates a highly visible media space that will be more agreeable to the users of these devices than current methods.

Instead of advertising above, below, to the sides, in the middle, on top, or using any of the current banner and pop-up methods, the present invention alters the delivery method. The present invention puts the advertising between the content and/or media during necessary functional delays such as loading new pages. The present invention is a response to the need for a more visible and at the same time less intrusive form of advertising on and/or digital networking capable devices.

There has thus been outlined, rather broadly, the more important features of the system and method of advertising for internet and network capable devices in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

These together with other objects of the invention, along with the various features of novelty, which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

DETAILED DESCRIPTION OF THE PREFERRED EMBODIMENTS

Figure 1:
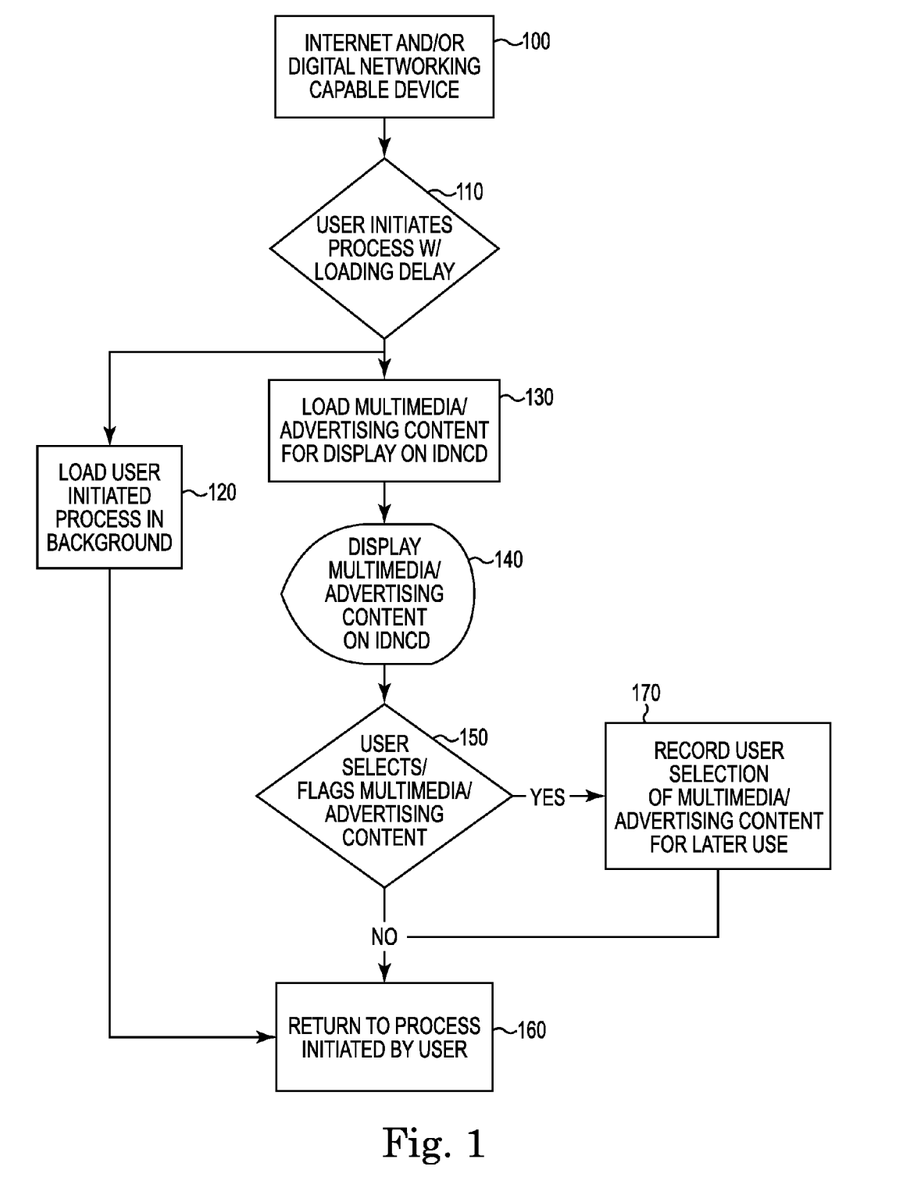
FIG. 1 is a block diagram illustrating a method for receiving multimedia/advertisement on an internet and/or digital wherein by selected/flagged displayed multimedia/advertisement is recorded.

FIG. 1 illustrates a block diagram of a preferred embodiment of the instant invention 10 for a system and method of advertising for use on internet and/or digital networking capable devices. In this embodiment, a method for receiving multimedia/advertisement on an internet and/or digital networking capable device ("IDNCD") is shown, wherein a selection and/or flagging of displayed multimedia and/or advertisement by either the system or an individual user is recorded. At step 100 an individual user of the system initiates the process by interacting with an IDNCD. At step 110, the user initiates a process on the IDNCD, wherein the process includes a loading or scheduled time delay; in one embodiment, the process may include starting a software application on the IDNCD. At step 120, a background or similar appearance is displayed on a screen of the IDNCD during the loading and/or scheduled delay upon initiation of the process in step 110. At step 160, the IDNCD redirects the user to the process that was initiated in step 110 once the loading and/or scheduled delay is complete; in this embodiment, the user is redirected to the software application that was loaded to begin to utilize the application. In conjunction with the user initiating the loading process at step 110 and the background being displayed at step 120, a quantity of multimedia/advertisement content is disposed to load on the IDNCD at step 130 during a predetermined time period for the loading of the application. At step 140, a quantity of multimedia/advertisement content is displayed on the screen of the IDNCD. At step 150, the user is provided with an option to either select and/or flag the multimedia/advertisement content previously displayed on the IDNCD. Upon selection/flagging of the multimedia/advertisement content at step 170, then a record of the selected multimedia/advertisement is kept for later use by the user of IDNCD. Conversely, if the user of the IDNCD makes a decision not to select and/or flag any of the multimedia/advertisement content, then the user is ultimately redirected to the completed process which was previously initiated by the user at step 160.

Figure 2:
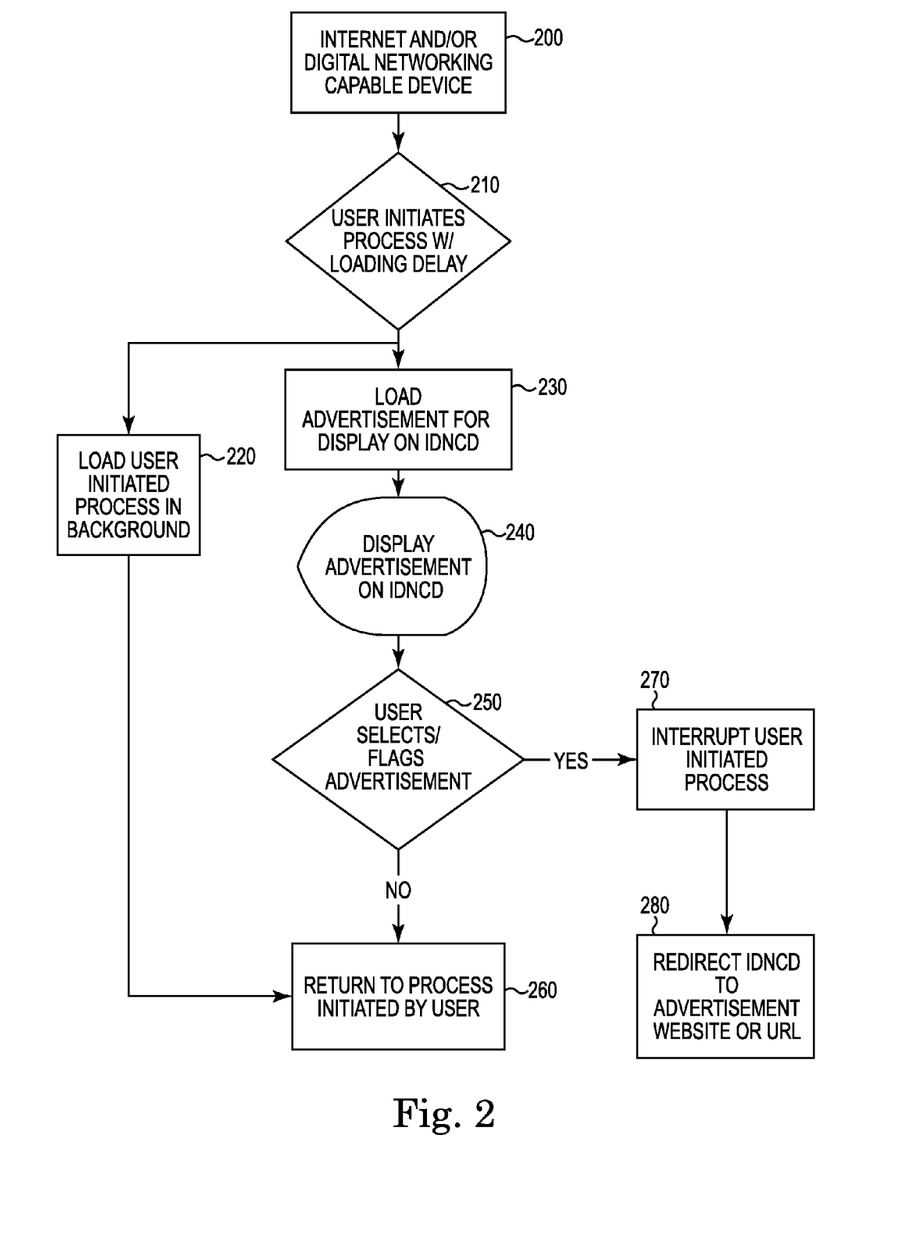
FIG. 2 is a block diagram illustrating a method for receiving multimedia/advertisement on an internet and/or digital networking capable device (IDNCD) wherein the content may be selected/flagged by a user initiated process and redirected.

FIG. 2 illustrates a block diagram of method for receiving multimedia/advertisement on an internet and/or digital networking capable device ("IDNCD") wherein the content may be selected/flagged by a user initiated process and subsequently redirected. At step 200 an individual user of the system initiates the process by interacting with an IDNCD. At step 210, the user initiates a process on the IDNCD, wherein the process includes a loading or scheduled time delay; in one embodiment, the process may include starting a software application on the IDNCD. At step 220, a background or similar appearance is displayed on a screen of the IDNCD during the loading and/or scheduled delay upon initiation of the process in step 210. At step 260, the IDNCD redirects the user to the process that was initiated in step 210 once the loading and/or scheduled delay is complete; in this embodiment, the user is redirected to the software application that was loaded to begin to utilize the application. In conjunction with the user initiating the loading process at step 210 and the background being displayed at step 220, a quantity of multimedia/advertisement content is disposed to load on the IDNCD at step 230 during a predetermined time period for the loading of the application. At step 240, a quantity of multimedia/advertisement content is displayed on the screen of the IDNCD. At step 250, the user is provided with an option to either select and/or flag the multimedia/advertisement content previously displayed on the IDNCD. Upon selection/flagging of a quantity of multimedia/advertisement content by the user, then at step 270, there is an interruption in the user initiated process previously started at step 210. Following interruption of the initiated process, the user of the IDNCD is redirected to the website or URL of the selected advertisement/multimedia content at step 280. Conversely, if the user of the IDNCD makes a decision not to select and/or flag any of the multimedia/advertisement content, then the user is ultimately redirected to the completed process which was previously initiated by the user at step 260.

Figure 3:
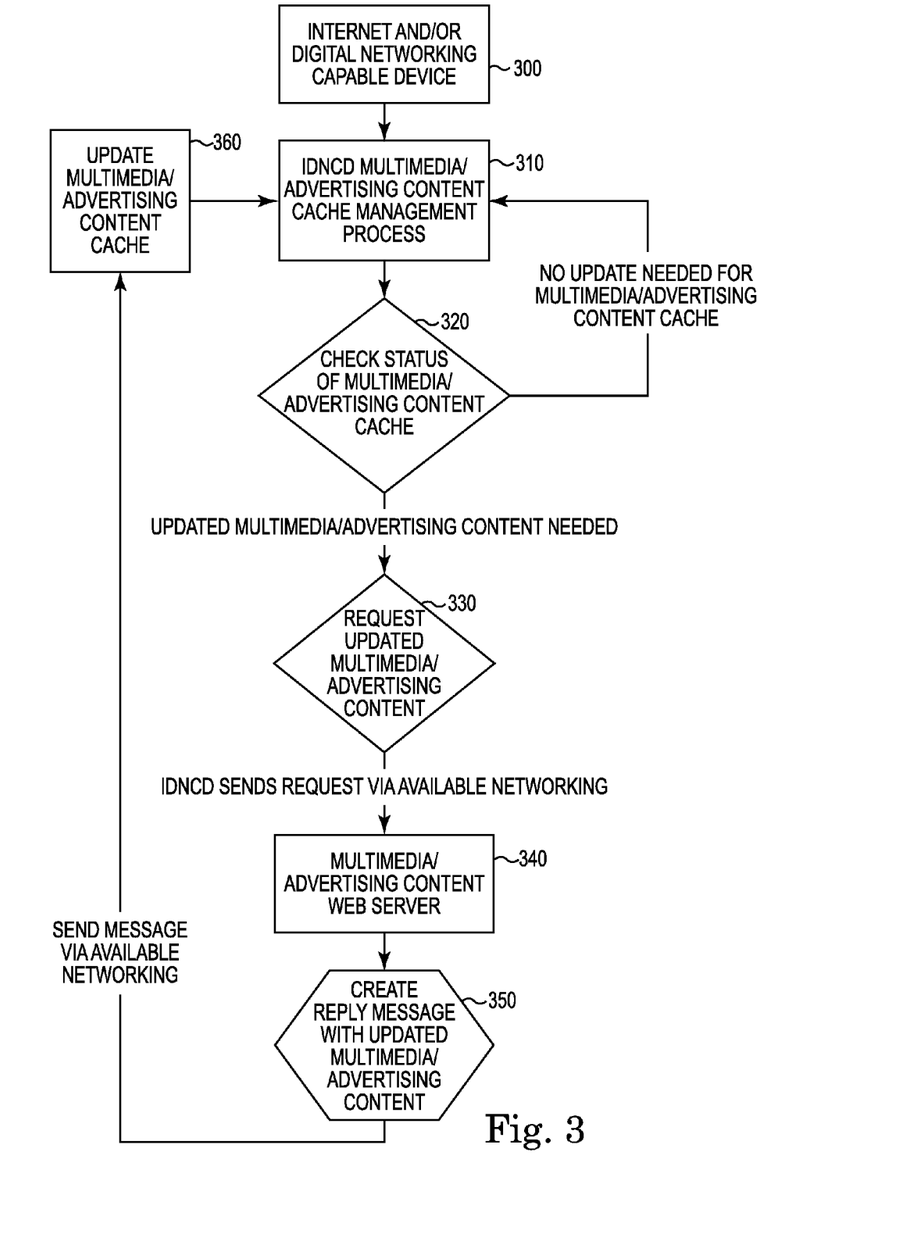
FIG. 3 is a block diagram illustrating a method for delivering multimedia/advertising content to an internet and/or digital networking capable device (IDNCD) wherein a system within the IDNCD or the device itself is disposed to manage a cache of multimedia/advertising content that is updated as necessary through a plurality of available digital networks.

FIG. 3 illustrates a block diagram of a method for delivering multimedia/advertising content to an internet and/or digital networking capable device ("IDNCD") wherein a system located within the IDNCD is disposed to manage a cache of multimedia/advertising content and wherein the system automatically updates the content as necessary through a plurality of available digital networks. At step 300 a user of the IDNCD may either initiate or conclude a multimedia/advertisement content display thereby prompting a cache management system at step 310 to initiate a process of determining whether it is necessary to provide an update to the multimedia/advertising content cache. At step 320, the management system checks the cache of the multimedia/advertisement content. If the event that the system determines that no new content is needed then the system cycles back to the start at step 310 and awaits for further initiation. Conversely, when the system determines that an update is necessary then a request is sent at step 330 through a plurality of available digital networks to a multimedia/advertising content server in step 340. At step 350, the server is disposed to create an update for the IDNCD device cache or an entirely new packet of multimedia/advertising content that is sent back to the device through a plurality of available digital networks. At step 360, the cache of the IDNCD is then updated with the updated or new digital multimedia/advertising content created in step 350 at which point the system cycles back to step 310 and awaits further requests.

Figure 4:
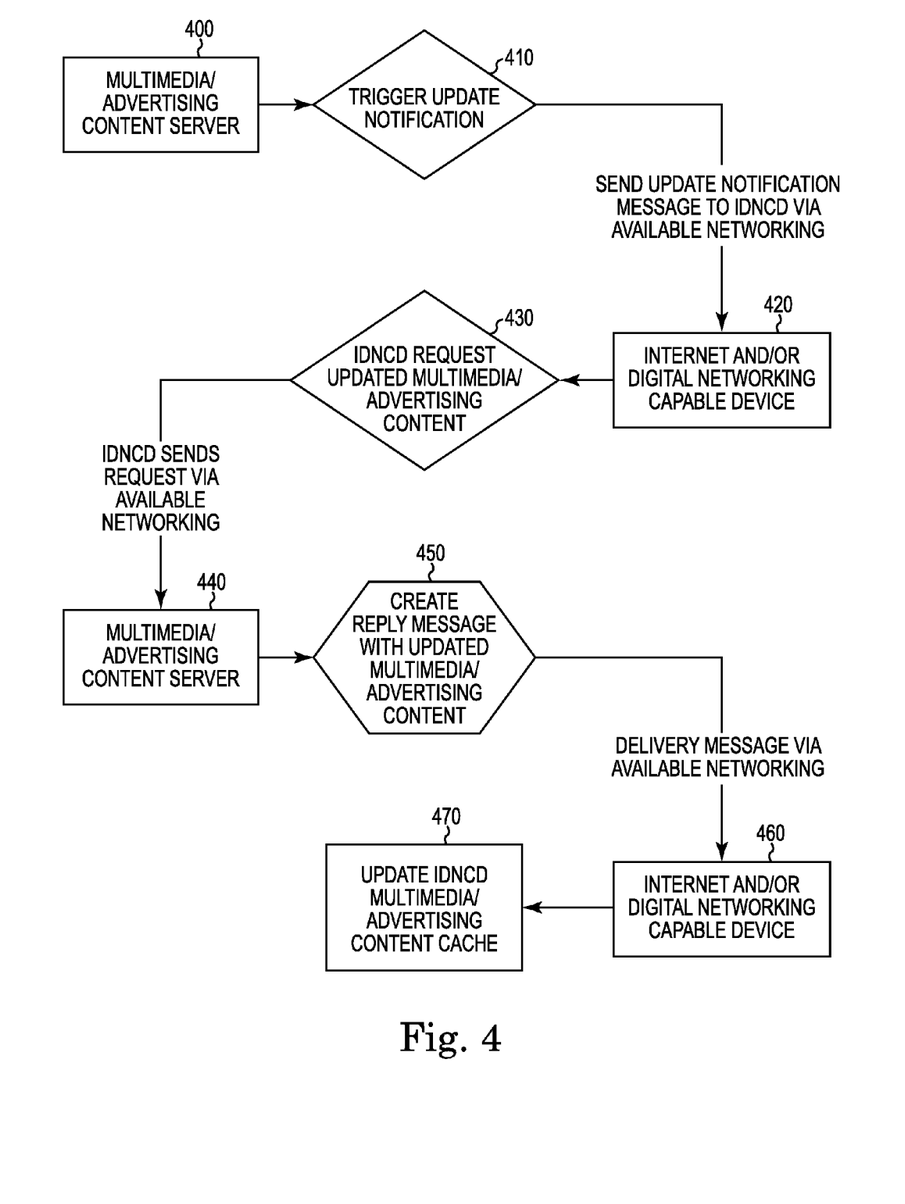
FIG. 4 is a block diagram illustrating a method for delivering multimedia/advertising content to an internet and/or digital networking capable device (IDNCD) wherein a multimedia/advertising content server is disposed to manage a cache of multimedia/advertising content on an IDNCD that is updated as necessary through a plurality of available digital networks.

FIG. 4 illustrates a block diagram of a method for delivering multimedia/advertising content to an internet and/or digital networking capable device ("IDNCD") wherein a multimedia/advertising content server is disposed to manage a cache of multimedia/advertising content on an IDNCD, wherein the cache is updated as required by the system through a plurality of available digital networks. At step 400, the server initiates a notification to be transmitted to the IDNCD. At step 410, the notification from the server is triggered, and subsequently transmitted through a plurality of available digital networks to the IDNCD in step 420. At step 430, the IDNCD or the user of the device responds to the notification initiated by the server and allows for the updates to be delivered to the IDNCD. At step 440, the notification is transmitted back from the IDNCD to the multimedia/advertising content server through a plurality of available digital networks. At step 450, the server is disposed to create an update for the IDNCD device cache or an entirely new packet of multimedia/advertising content that is transmitted to the device through a plurality of available digital networks. At step 460, once the content reaches the IDNCD, the cache of the IDNCD is then updated in step 470 with the updated or new digital multimedia/advertising content.

Figure 5:
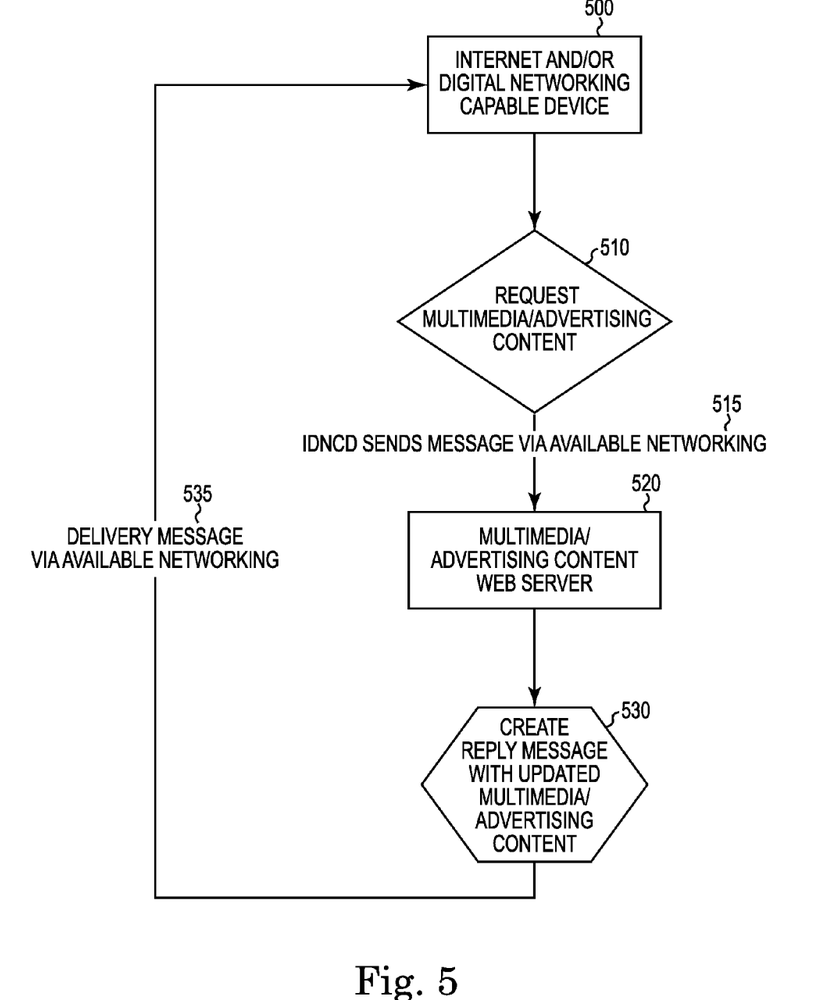
FIG. 5 is a block diagram illustrating a method for displaying multimedia/advertising content on an internet and/or digital networking capable device (IDNCD) wherein the content is retrieved by the device in real-time.

FIG. 5 illustrates a block diagram of a method for displaying multimedia/advertising content on an internet and/or digital networking capable device ("IDNCD") wherein the content is retrieved by the device in real-time. This embodiment is preferably utilized when the network/internet connection available to the IDNCD possesses very high speed and has very small latency, reducing the overall time for this process to complete. At step 500 a user of the IDNCD determines that content is need, and initiates a request for content at step 510. The content request from the IDNCD is in the form of a message sent through a plurality of available digital networks at step 515, wherein the message is received by a multimedia/advertising content server, at step 520. Upon receiving the message, the server creates a reply message containing all the data and content requested by the IDNCD at step 530. The replay message prepared at 530 is transmitted from the server to IDNCD at step 535, thereby completing the original request for content.

Figure 6:
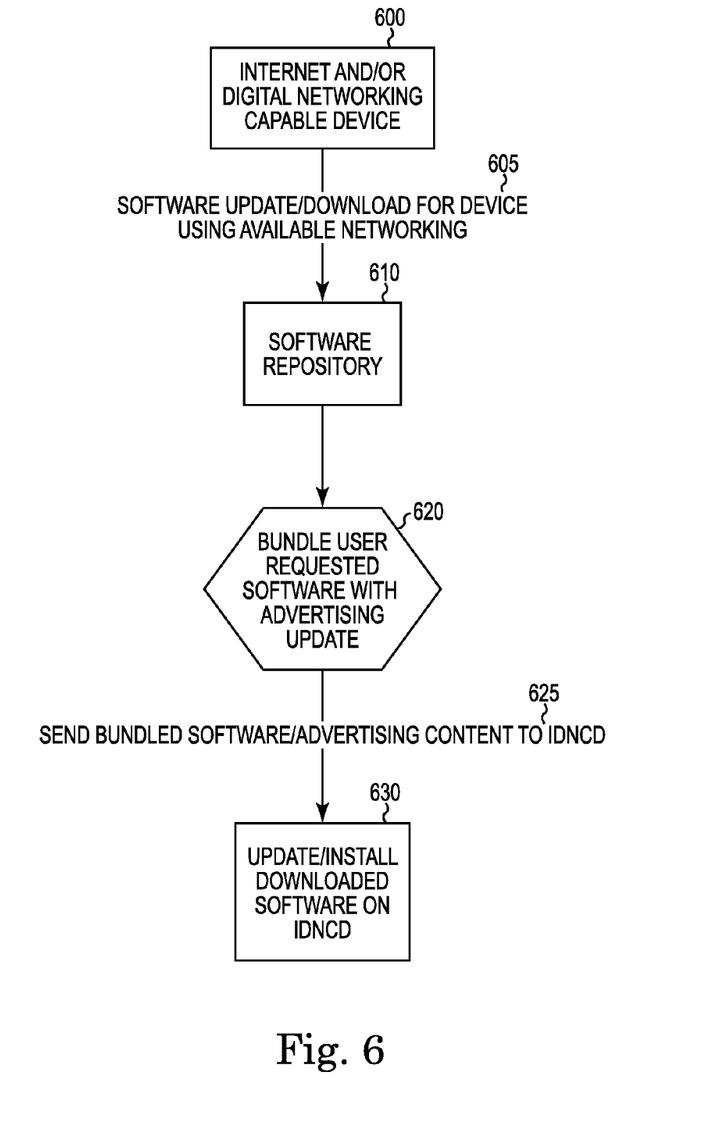
FIG. 6 is a block diagram illustrating a method for updating the cache of multimedia/advertising content on an internet and/or digital networking capable device (IDNCD) wherein the cache of advertising content is updated on the device in the event that additional software, programs, apps, firmware is downloaded or installed.

FIG. 6 illustrates a block diagram of a method for updating the cache of multimedia/advertising content on an internet and/or digital networking capable device ("IDNCD") wherein the cache of advertising content is updated on the device when additional software, programs, apps, firmware is either downloaded or installed. This embodiment may be utilized in conjunction with other methods of content delivery or when users are expected to download or update programs on their devices frequently. At step 600, a user of the IDNCD or the device itself, requests a software update/download from a software repository available through a plurality of available digital networks at step 605. At step 610, the software repository prepares the software or update request and bundles the software with updated multimedia/advertising content at step 620. The bundled software/multimedia content is transmitted to the device (or is made available to be downloaded directly from the device) through a plurality of available digital networks at step 625. The IDNCD then installs or updates the software from the bundle and updates the devices multimedia/advertising content cache with the update at step 630.

Figure 7:
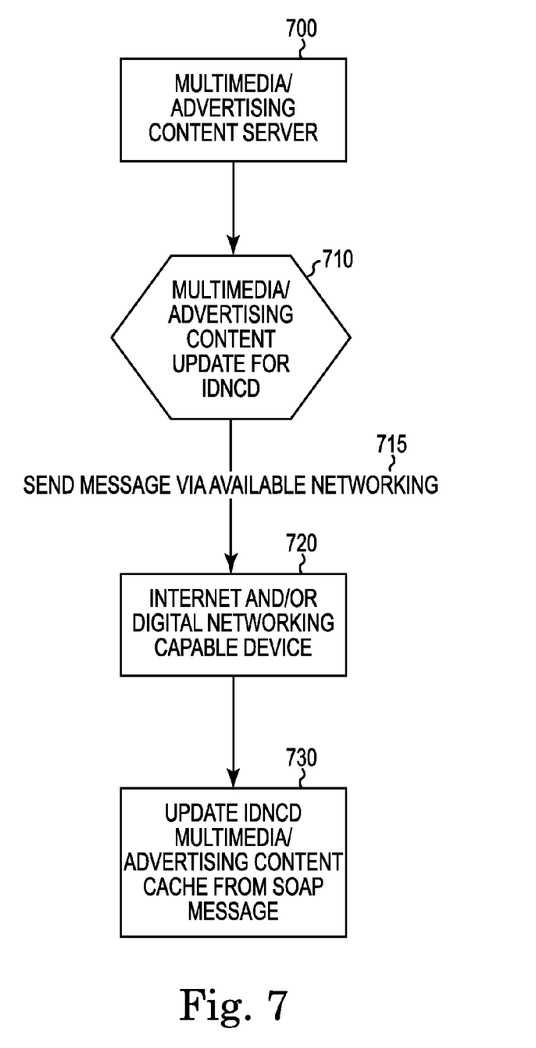
FIG. 7 is a block diagram illustrating a method for updating the cache of multimedia/advertising content on an internet and/or digital networking capable device wherein a server is disposed to transmit updated content directly to the device.

FIG. 7 illustrates a block diagram of a method for updating a cache of multimedia/advertising content on an internet and/or digital networking capable device ("IDNCD") wherein a server is disposed to transmit updated content directly to the device. At step 700, the server possesses a quantity of multimedia/advertising content. At step 710, the server prepares the updated content for the cache on the IDNCD. At step 715, the prepared content by the server is transmitted through a plurality of available digital networks to the IDNCD. In this embodiment, the message transmitted to the device may be the content itself, or the universal resource indicator of the content to allow the device to initiate the actual download. Once the IDNCD receives the updated content at step 720, the device uses the downloaded content to update the cache on the device, 730.

We claim:

1. A method for receiving a quantity of multimedia/advertisement content on an internet and/or digital networking capable device ("IDNCD"), comprising the steps of:
    starting a process on the IDNCD based on a selection from a user, wherein the process includes a loading time delay;
    communicating with a multimedia/advertisement content server to determine if a new packet of multimedia/advertisement content is needed;
    transmitting the new packet of multimedia/advertisement content from the multimedia/advertisement content server to a content cache on the IDNCD upon starting of the loading time delay;
    loading a quantity of multimedia/advertisement content on the IDNCD upon starting of the loading time delay on the IDNCD;
    displaying the quantity of multimedia/advertisement content, and indicia that the loading time delay is in progress, on a screen of the IDNCD;
    providing a mechanism for the user to select the multimedia/advertisement content displayed on the screen of the IDNCD;
    stopping the displaying of the quantity of multimedia/advertisement content once the loading time delay is complete; and
    redirecting the user to the selected process upon completion of the loading time delay.

2. The method of receiving a quantity of multimedia/advertisement content of claim 1, further comprising the steps of:
    receiving an input indication that a quantity of multimedia/advertisement content displayed on the screen of the IDNCD has been selected; and storing the selected multimedia/advertisement content for later use.

3. The method of receiving a quantity of multimedia/advertisement content of claim 1, further comprising the step of:
   displaying a background on the screen of the IDNCD once the process is initiated; and
   loading the process on the background of the screen of the IDNCD.

4. The method of receiving a quantity of multimedia/advertisement content of claim 1, wherein the new packet is transmitted through a plurality of available digital networks.

5. The method of receiving a quantity of multimedia/advertisement content of claim 1, further comprising the steps of:
   initiating an update notification by the multimedia/advertisement content server;
   transmitting the notification from the content server to the IDNCD through a plurality of available digital networks;
   responding to the notification transmitted from the content server; and
   allowing for the update of the cache of the multimedia/advertisement content by the content server.

6. The method of receiving a quantity of multimedia/advertisement content of claim 1, wherein determining whether the new packet of multimedia/advertisement content is needed is based on received input.

7. The method of receiving a quantity of multimedia/advertisement content of claim 1, further comprising the steps of:
   requesting a software update of the IDNCD from a software repository;
   preparing the software update by the software repository;
   bundling the software update in conjunction with the new packet of multimedia/advertisement content;
   transmitting the bundle to the IDNCD; and
   installing the software update from the bundle on the IDNCD.

8. A method for displaying advertisement content on an internet capable device, comprising the steps of:
   providing an option to a user to initiate a process on the internet capable device;
   receiving input from the user to initiate the process on the internet capable device;
   loading the process on the internet capable device, wherein the loading includes a loading time delay;
   communicating with an advertisement content server to determine if a new packet of multimedia/advertisement content is needed;
   transmitting the new packet of advertisement content from the advertisement content server to a content cache on the internet capable device upon initiation of the loading time delay;
   displaying a quantity of advertisement content, and indicia that the loading is in progress, on a screen of the internet capable device during the loading time delay;
   providing the user an input option to select the quantity of advertisement content;
   determining that the loading time delay has concluded;
   stopping the displaying of the quantity of advertisement content on the internet capable device upon determining the loading time delay has concluded; and
   redirecting the user to the process upon completion of the loading time delay.

9. The method for displaying advertisement content on an internet capable device of claim 8, wherein the internet capable device is a mobile device.

10. A method for displaying advertisement content during a time delay process, comprising:
    providing a content server including advertising content;
    providing a device capable of communication with the content server via the internet;
    providing an option to initiate a process on the device;
    receiving input from a user on the device to initiate the process;
    loading the process, via the internet, including a loading time delay;
    communicating with the content server;
    transmitting a new packet of advertisement content from the content server to a content cache on the device upon initiation of the loading time delay;
    displaying a quantity of advertisement content, and indicia that the process is in progress, on a screen of the device based on initiation of the loading time delay;
    providing the user an input option to select the quantity of advertisement content;
    determining that the loading time delay has concluded;
    stopping the displaying of the quantity of advertisement content on the device upon determining the loading time delay has concluded; and
    redirecting the user to the process after conclusion of the loading time delay.

11. The method for displaying advertisement content during a time delay process of claim 10, wherein the device is a mobile device.

12. The method for displaying advertisement content during a time delay process of claim 10, further comprising the steps of:
    transmitting a request from the device to the content server;
    determining if the advertisement content needs updating; and
    generating the new packet of advertisement content on the content server.

* * * * *